Figure 1:
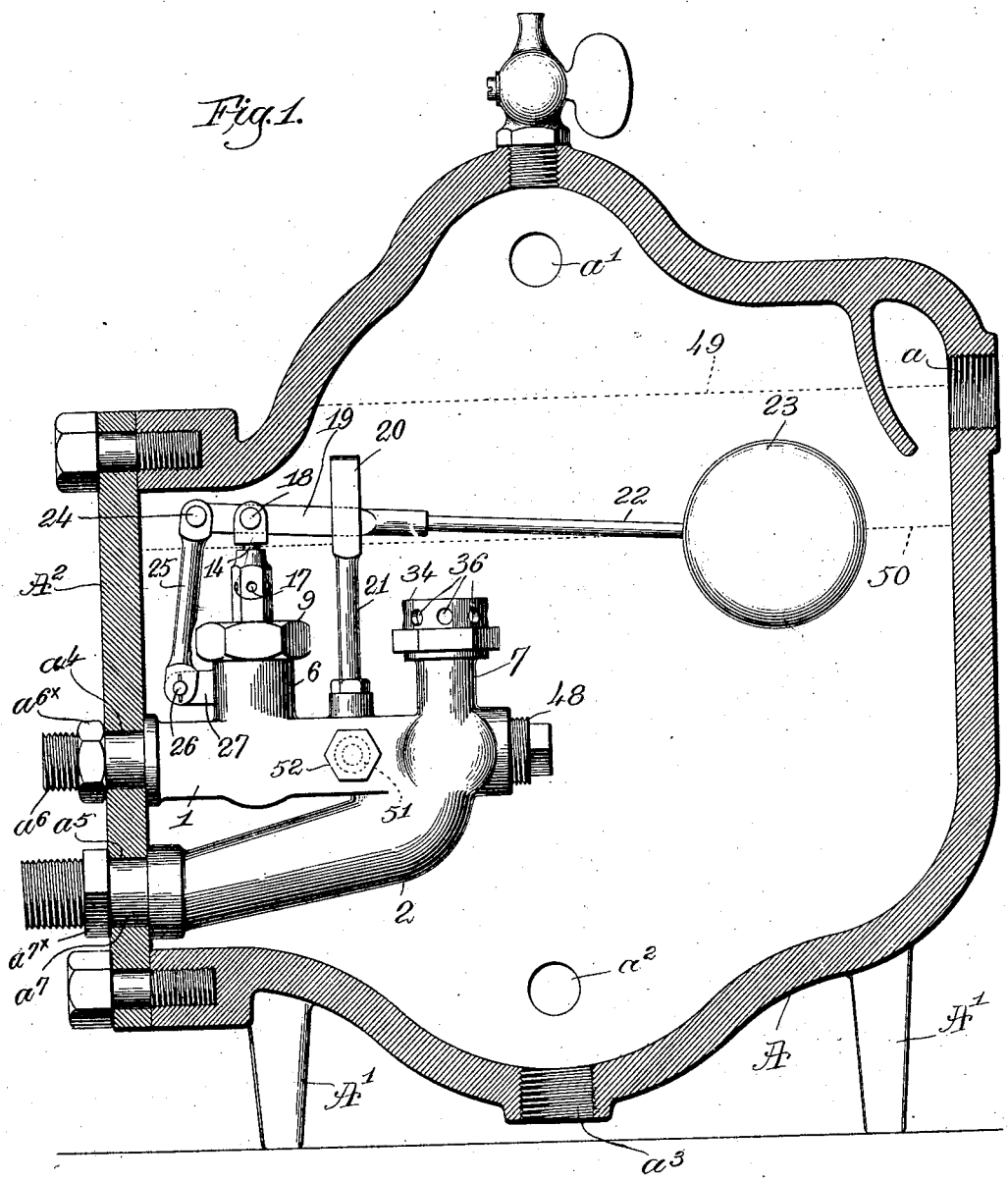

No. 862,295. PATENTED AUG. 6, 1907.
W. R. TEMPLETON.
STEAM TRAP.
APPLICATION FILED MAY 18, 1906.

2 SHEETS—SHEET 1.

Witnesses:
Thomas J. Drummond
Walter R. Trott

Inventor.
William R. Templeton,
by Crosby Gregory
Attys.

No. 862,295. PATENTED AUG. 6, 1907.
W. R. TEMPLETON.
STEAM TRAP.
APPLICATION FILED MAY 18, 1906.
2 SHEETS—SHEET 2.
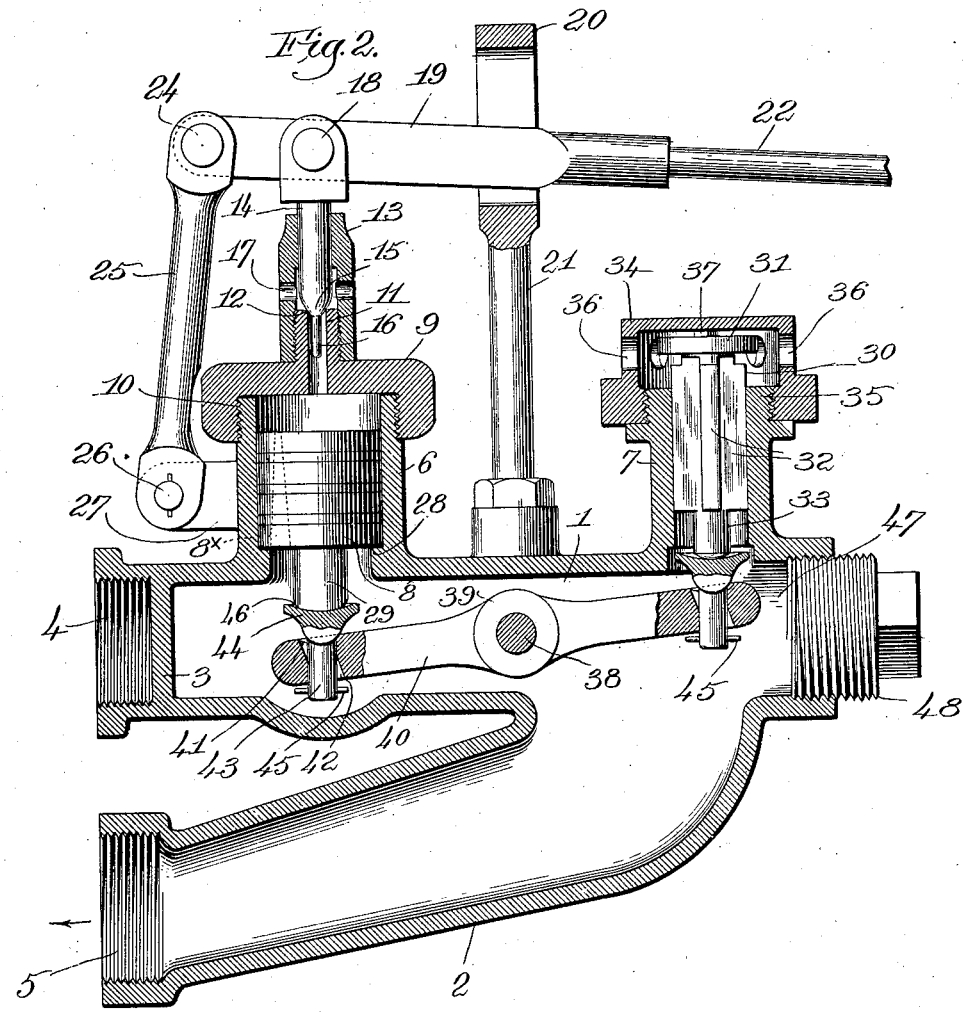
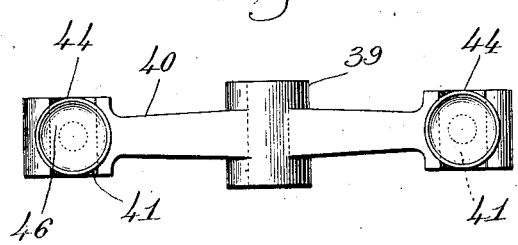
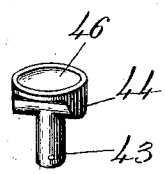
Witnesses.
Thomas J. Drummond
Walter R. Trott
Inventor.
William R. Templeton
by Crosby Gregory
attys.

UNITED STATES PATENT OFFICE.

WILLIAM R. TEMPLETON, OF BOSTON, MASSACHUSETTS, ASSIGNOR OF ONE-HALF TO WALTER A. O'BRIEN, OF BOSTON, MASSACHUSETTS.

STEAM-TRAP.

No. 862,295.      Specification of Letters Patent.      Patented Aug. 6, 1907.

Application filed May 18, 1906. Serial No. 317,503.

*To all whom it may concern:*

Be it known that I, WILLIAM R. TEMPLETON, a citizen of the United States, and a resident of Boston, county of Suffolk, State of Massachusetts, have invented an Improvement in Steam-Traps, of which the following description, in connection with the accompanying drawings, is a specification, like letters on the drawings representing like parts.

This invention has for its object the production of a novel, simple and efficient steam trap having a large discharge capacity and capable of operating properly without readjustment at any pressure between widely separated extremes, say from zero up to 250 lbs. or higher.

In the construction of my novel steam trap I have eliminated weights, springs, diaphragms, expansion levers, and working joints, and have reduced to a minimum the care and labor requisite to maintain the trap in perfect operative condition.

The working pressure to which the trap may be subjected may vary from low to high without interfering with its efficiency or automatic action, and the maximum pressure under which a given trap will operate is a matter readily determined in the first instance, according to circumstances.

The various novel features of my invention will be fully described in the subjoined specification and particularly pointed out in the following claims.

Figure 1 is a vertical sectional view of the shell or casing of the trap, and within it in elevation the operative parts embodying my invention, the movable parts being shown in the position assumed when the outlet or discharge valve is closed; Fig. 2 is a partial vertical section of the operative parts, the casing being omitted, and the outlet valve is shown as lifted from its seat, or open, as when there is no pressure in the casing, the outlet valve and the controlling piston therefor being shown in elevation; Fig. 3 is a top plan view of the rocking or tilting transmitter between the outlet valve and its controlling piston and by means of which the valve is opened; Fig. 4 is a perspective view of one of the rockers which is mounted on the transmitter at each end thereof, forming an anti-friction connection between it and the valve and controlling piston, respectively.

Referring to Fig. 1, the main shell or casing A having an inlet $a$ and openings $a'$, $a^2$ for the water or gage-glass usually and preferably employed in connection with steam traps, (to indicate whether or not the same is operating properly) is supported on suitable feet or legs $A'$, and has at its lowest portion a threaded opening $a^3$ for a sediment blow-off cock, not shown, and which may be of any desirable construction. An opening is made in the side of the casing, normally closed by a fluid-tight head or plate $A^2$, to which is attached the operative mechanism of the trap, so that when necessary to examine such mechanism it may be removed as a whole by removing the closure $A^2$. The latter has two holes $a^4$, $a^5$, one above the other through which are extended connections $a^6$, $a^7$, Fig. 1, the former being preferably a plug, and the latter a tube which forms a continuation of the discharge passage proper of the trap, to be referred to. The outer ends of said connections are threaded, to receive nuts $a^{6x}$, $a^{7x}$, by which the said connections are secured firmly yet detachably to the closure $A^2$, the connections at their inner ends being attached to the auxiliary or inner casing, to be referred to. Such auxiliary casing is in the present embodiment of my invention made as a casting having branches or arms 1, 2, the branch 1 having one of its ends closed as at 3, Fig. 2, and threaded internally at 4 to receive the inner end of the plug $a^6$, the latter being screwed tightly into the dead end of the branch 1. The adjacent end of the branch 2 is also internally threaded as at 5, Fig. 2, to receive the inner end of the tubular connection $a^7$.

In practice the two branches of the auxiliary casing are located one above the other, so that when the adjacent ends, into which are tightly screwed the plug and tubular connection referred to, are brought up against the inner face of the closure $A^2$, the plug will project through the opening $a^4$, and the tubular connection $a^7$ through the opening $a^5$, and by tightening up the nuts $a^{6x}$ and $a^{7x}$ the auxiliary casing is rigidly attached to the closure fluid-tight and is held securely in proper position. The plug serves as a positioning device as well as a secondary connection between the closure and the auxiliary casing.

A branch 1 is shown in Figs. 1 and 2 as provided with two upright tubular bosses 6 and 7, the former near the dead end and the latter adjacent the opposite end of the branch, the boss 6 being of larger diameter and constituting a cylinder in which a piston 8 is longitudinally movable, the cylinder being provided with a removable head 9 secured in place by screwing onto the upper and externally threaded end 10 of the cylinder, see Fig. 2. The head 9 is provided with a central tubular boss 11 forming an annular seat at 12 for an auxiliary valve to be referred to, the boss 11 being externally threaded to receive thereon a valve guide 13 in which is slidably guided the stem 14 of the auxiliary valve 15, this valve being formed by tapering the lower end of the stem 14 to fit the valve seat 12. A needle-like extension 16 is provided on the end of the valve to project into the boss 11 and tending to at all times keep the same clear of any sediment or other obstruction which might otherwise lodge therein. It will be manifest that the valve 15 controls the sole communication between the main shell or casing A of the trap and the interior of the cylinder 6 above the piston, the guide 13 having apertures 17 by means of which communication is freely established with the main shell. The upper end of the valve spindle is pivotally connected at 18 to a lever 19 vertically movable in a longitudinal guide slot 20 formed in the upper end of a standard 21, fixedly mounted on the branch 1. The end of the lever 19 extended through the guide-slot has attached to it a rod 22 to the end of which is secured a ball or other float 23. The opposite and shorter arm of the lever 19 is pivotally connected at 24 with a link 25 fulcrumed at 26 on an ear 27 extended laterally from the cylinder as herein shown. Manifestly the valve 15 will be raised from its seat or lowered thereon by the rise or fall of the float 23, such rise and fall being governed by the level of the liquid collecting in the main shell of the trap. The piston 8 is provided with a small passage $8^x$, Fig. 2, the upper end of this passage being very considerably smaller than the area of the auxiliary valve-seat 12. An annular shoulder 28 is formed on the inner wall of the cylinder below the piston to limit inward movement of the latter, and a projecting stud 29 having a rounded end is secured to or forms part of the lower end of the said piston. The purpose of this stud will be described hereinafter.

The tubular boss 7 of less diameter than the cylinder, as has been before pointed out, constitutes an outlet or discharge port for the trap, and the branch 2 of the auxiliary passage constitutes a discharge passage, the latter communicating with the outlet port, as will be manifest from an inspection of Fig. 2. The upper end of the boss 7 forms an annular seat 30 for a valve 31 having lateral wings or guides 32 which slide easily within the walls of the outlet port, and when the valve is closed upon the seat 30 communication between the main shell of the trap and the discharge passage 2 is completely shut-off. A stud 33 having a rounded lower end projects from the bottom of the wings 32, and a cap 34 is screwed onto the externally threaded portion 35 of the boss 7, inclosing the outlet valve 31. Apertures 36 in the cap permit fluid contents of the main shell to pass into the cap, and when the valve is opened, down through the port to the discharge passage. A projection 37 on the top of the valve has a two-fold purpose, one of which is to coöperate with the inner side of the top of the cap 34, and thereby limit opening movement of the valve 31, and the other purpose is to enable the valve to be grasped by a suitable tool when it is desired to grind the valve and its seat. The cap not only protects the outlet valve but prevents any large bodies of sediment or other foreign matter from passing into the outlet port.

I have provided a transmitting connection between the piston and the outlet valve, whereby when the valve is seated the piston will be raised, and when the latter is pressed downward the outlet valve will be raised from its seat. The piston is not only of greater area than the outlet valve 31, but it is also heavier, so that when there is no pressure in the trap the weight of the piston will cause it to descend and to lift the outlet valve, so that the trap will discharge down to the level of the openings 36. This is a great convenience when pressure is shut off for the day for instance, as no attention is required on the part of the engineer to vent the trap to the desired extent. The branch 1 is provided with opposite apertures at a point midway between the projecting studs 29 and 33 to receive a transverse fulcrum pin 38 which fits snugly into the openings and which is passed through the central hub 39 of the transmitter shown as a rocking or tilting lever 40, a plan view of the lever being shown in Fig. 3. At each end, the lever is provided with a transverse rounded groove 41, and a hole 42 is made through the lever from the bottom of the groove to receive loosely the stem 43 of a cup-like connection 44, a cotter-pin or other suitable device 45 being passed through the projecting end of the stem to prevent accidental disengagement of the connection 44 and the lever.

Referring to Fig. 2, and also to Fig. 4, it will be seen that the top of each connection 44 is hollowed out or concaved at 46 to receive the rounded end of one or the other of the studs 29, 33, and by reference to Fig. 2 it will also be seen that the connection itself can rock in the transverse groove or seat 41. As the transmitter or lever 40 rocks or tilts on its fulcrum 38, an anti-friction and flexible connection is provided by the means described between the lever ends and the piston and the outlet valve respectively.

In order to insert the transmitter in the branch 1, the right hand end thereof, viewing Figs. 1 and 2, is provided with an internally threaded opening 47 which is tightly closed by a plug 48, after the transmitter has been inserted. The steam trap is located at the lowest possible point of the steam system, as is usual, so that the water of condensation will flow into the main shell A through the inlet $a$. First referring to Fig. 2, it will be supposed that the trap is empty and under no pressure, and at such time the weight of the piston 8 acts through the transmitter 40 to lift the outlet valve 41 from its seat, opening the discharge outlet of the main casing. At such time too the float 23 will be in its low position, and the auxiliary valve 15 will be closed, shutting off communication between the main casing and the cylinder 6. When the pressure within the main casing rises, supposing the steam system to be in operation, such pressure will act upon the outlet valve and will close the same as soon as the pressure is sufficient to overcome the weight of the piston, and the trap is thus closed while the water collects therein. When the water level rises sufficiently to begin to lift the float, the latter in turn begins to open the auxiliary or pilot valve 15, as it may be termed, admitting fluid pressure to the cylinder 6. The fluid so admitted, either water or steam, at first will rush through the small passage $8^x$ in the piston, but as the float continues to rise and the pilot valve fully opens, the area of inlet to the cylinder will be greater than the area of the outlet passage $8^x$, and consequently the piston will be moved downward by the full pressure within the main passage. As the area of the piston is greater than the area of the outlet valve, the opening pressure acting upon such outlet valve will be augmented or increased above the closing or resisting pressure on such outlet valve, and the latter will be promptly opened, allowing a full and complete discharge of water from the trap through the discharge passage formed by the branch 2 of the auxiliary casing.

In practice I prefer to have the high-water level at about the broken line 49, Fig. 1, and the ordinary low level at about the broken line 50, and it will be observed that this ordinary low water level is above the openings 17 in the guide 13 for the pilot or auxiliary valve, so that so long as the steam system is in operation there will be a water seal as it were above the said valve, preventing the passage of steam into the cylinder, and also water-sealing the outlet valve. This effectually prevents the escape of steam from the trap along with the water of condensation. The proper amount of water having been discharged or vented from the trap, the float will drop, and in so doing will close the pilot or auxiliary valve 15, shutting off communication between the cylinder and the interior of the main casing. As soon as the said auxiliary valve resumes its seat, the fluid under pressure then contained in the cylinder will leak out through the small passage in the piston, the pressure within the cylinder gradually diminishing and permitting the closing pressure in the main casing to act upon and gradually close the outlet valve, so that the back-pressure on the piston acts to cushion the closing movement of the outlet valve. This is a valuable feature as it prevents hammering of the outlet valve, and gradually reduces the wear on both valve and valve-seat.

Both the outlet and pilot or auxiliary valves are located at such a distance from the bottom of the main casing of the trap as to be free from grit and dirt which may possibly enter from the steam system, the cap for the outlet valve and the guide 13 for the auxiliary or pilot valve assisting in obviating any clogging, as any solid matter which will go through the apertures 17 or 36 will pass safely through either the auxiliary or the outlet valves. The cylinder head 9 and the auxiliary valve seat are formed as an integral part, and the head is fluid-tight on the cylinder and is on the pressure side thereof. When pressure is shut off from the trap, even if the float is then at the low water level 50, the weight of the piston will open the outlet valve and all of the water will be drawn off from the trap down to the level of the openings 36, the trap operating at this time automatically as will be manifest. The higher the maximum pressure under which the trap is designed to operate, the smaller relatively speaking will be the passage $8^x$ through the piston, and whether the maximum or minimum pressures are or are not widely separated, the operation of the trap will be the same without any readjustment, and for various pressures below and up to the maximum. In other words, if a trap embodying my invention is designed to operate at as high a pressure as three or four hundred pounds per square inch, it will operate equally well if the pressure is five pounds or fifty pounds etc.

The fulcrum pin 38 is loose in the hub 39 of the transmitter 40, and tight in the holes in the sides of the branch 1, threaded bosses as 51 being formed on the sides of the branch to receive caps 52, see Fig. 1 screwed tightly thereon, making the openings for the fulcrum pin steam tight.

Inasmuch as the caps 52 and the plug 48 close the adjacent openings of the auxiliary casing fluid-tight, it will be obvious that the outlet and auxiliary pilot valves positively and absolutely control all communication between the main and the auxiliary shells or casings.

My invention is not restricted to the precise construction and arrangement herein shown and described, as the same may be varied or rearranged in different particulars by those skilled in the art without departing from the spirit and scope of my invention.

Having fully described my invention, what I claim as new and desire to secure by Letters Patent is:—

1. In combination with a shell or casing of a steam trap having a discharge passage, an outlet valve directly subjected to and closed by the pressure within the casing, a controlling piston for and of greater area than said valve, transmitting means between said piston and valve, a normally closed pilot-valve to admit fluid under pressure from the casing to the piston, and means to open said pilot-valve when the water in the casing reaches a predetermined level, the fluid pressure on the piston then acting through it and the transmitting means in opposition to and to overcome the pressure on the outlet valve and open the same to discharge the trap.

2. In combination with a shell or casing of a steam trap having a discharge passage, an outlet valve therefor directly acted upon and closed by the pressure within the casing, means, including a pilot-valve and a piston, to open the outlet valve when the casing pressure on the piston exceeds the closing pressure on the outlet valve, and means to open the pilot-valve when the water in the casing reaches a predetermined level.

3. The combination, with a shell or casing of a steam trap having a discharge port, of a valve therefor adapted to be directly acted upon and closed by pressure within the casing, means, including an operatively connected piston of greater area than the valve, to open the latter when the fluid pressure on the piston exceeds the closing pressure on the valve, and means to subject the piston to the fluid pressure within the casing only when the water therein attains a predetermined level.

4. The combination, with a shell or casing of a steam trap having a discharge port, of a valve therefor adapted to be directly acted upon and closed by the fluid pressure within the casing, means to open the valve by the action of augmented fluid pressure against the force of such closing pressure, and a device to render said means operative when the water in the casing attains a predetermined level.

5. The combination, with a shell or casing of a steam trap having a discharge port, of a valve therefor adapted to be directly acted upon and closed by the fluid pressure within the casing and to be opened by such fluid pressure, and means to augment the valve-opening pressure when the water in the casing attains a predetermined level and to diminish such pressure when the trap has discharged.

6. The combination, with a shell or casing of a steam trap having a discharge port, of a valve therefor adapted to be opened and closed by fluid pressure within the casing, means to augment the valve-opening pressure when the water in the casing attains a predetermined level and to diminish such pressure when the trap has discharged, and means to effect automatic opening of the valve when the trap is relieved of pressure.

7. The combination, with a shell or casing of a steam trap having a discharge port, of a valve therefor adapted to be directly acted upon and closed by the fluid pressure within the casing, a cylinder, a piston movable therein of greater area than and operatively connected with the valve, an auxiliary valve to govern communication between the cylinder and the interior of the casing, and means to open said auxiliary valve and subject the piston to the fluid pressure in the casing only when the water therein attains a predetermined level, to thereby move the piston and open the outlet valve against the closing pressure thereon.

8. The combination, with a shell or casing of a steam trap having a discharge port, of a valve therefor adapted to be directly acted upon and closed by fluid pressure within the casing and to be opened by such fluid pressure means to augment the valve-opening pressure when the water in the casing attains a predetermined level and to diminish such pressure when the trap has discharged, and means to cushion the outlet valve in its closing movement by a gradual diminution of fluid pressure.

9. The combination, with a shell or casing of a steam trap having a discharge port, of a valve therefor adapted to be opened and closed by fluid pressure within the casing, means to exert augmented pressure upon the valve to open it when a predetermined amount of water collects in the casing, to thereby discharge the trap, and to diminish such pressure when discharge has been effected, to close the valve, and gravity-actuated means to open the valve when the casing is freed from pressure.

10. The combination, with a shell or casing of a steam trap having a discharge port, of a vertically-movable valve therefor closed by fluid pressure within the casing acting externally on the valve, a vertical cylinder within the casing, having a piston movable therein of greater area and weight than said valve, a transmitting connection between the valve and piston, an auxiliary valve to govern communication between the cylinder and casing, and means to open said auxiliary valve when the liquid in the casing attains a predetermined level, subjecting the piston to pressure and opening the outlet valve, closing of the auxiliary valve shutting off pressure on the piston and permitting the casing-pressure to close the outlet valve.

11. The combination, with a shell or casing of a steam trap having a discharge port, of a valve therefor adapted to be closed by fluid pressure within the casing, a cylinder, a piston movable therein of greater area than and operatively connected with the valve, an auxiliary valve to govern communication between the cylinder and the interior of the casing, the piston having a small passage through it of less area than the auxiliary valve, and float-operated means to open and close the latter, full opening of the auxiliary valve subjecting the piston to fluid pressure and opening the outlet valve against the resistance of the normal closing pressure, the fluid contents of the cylinder gradually passing therefrom through the small passage in the piston when the auxiliary valve is closed, to cushion the closing movement of the outlet valve.

12. The combination, with a main shell or casing of a steam trap having a side opening, a removable fluid tight closure therefor, and means attached to and supported by the closure to govern the operation of the trap, said means comprising a supplementary casing having a discharge duct extended through the closure and an outlet port within the main casing, a valve for said port, adapted to be closed by pressure within the main casing, a cylinder forming part of the supplementary casing, a piston movable within the cylinder, of greater area than and operatively connected with the outlet valve, an auxiliary valve to govern admission of fluid under pressure from the main casing to the cylinder, and a float to control the auxiliary valve, opening the same when a predetermined liquid level is attained in the main casing, to subject the piston to the fluid pressure within the main casing and effect opening of the outlet valve, to discharge the trap.

In testimony whereof, I have signed my name to this specification, in the presence of two subscribing witnesses.

WILLIAM R. TEMPLETON.

Witnesses:
JOHN C. EDWARDS,
MARGARET A. FEENEY.